United States Patent Office 3,595,971
Patented July 27, 1971

3,595,971
PROCESS FOR THE MANUFACTURE OF
POLYIMIDES
Erich Behr, Troisdorf, Germany, assignor to Dynamit
Nobel AG, Troisdorf, Germany
No Drawing. Filed July 3, 1969, Ser. No. 839,807
Claims priority, application Germany, July 4, 1968,
P 17 70 796.9
Int. Cl. C08g 20/32
U.S. Cl. 260—47
8 Claims

ABSTRACT OF THE DISCLOSURE

Process for preparing polyimides containing units having the following formula:

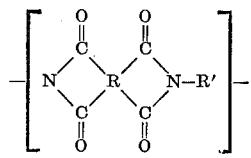

wherein R and R' each represent at least one aliphatic, aromatic or cycloaliphatic radical which may be substituted and which may contain hetero atoms comprising reacting a dicarboxylic acid diazide having the formula:

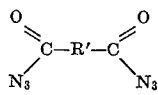

wherein R' has the same meaning as given above with a tetracarboxylic acid dianhydride having the formula:

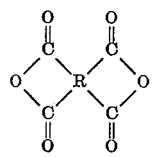

wherein R has the same meaning as given above, at a temperature of from 0 to 300° C. The adhesive compositions may contain minor amounts of adjuvants such as inert fillers or extenders, methyl cellulose, potassium tripolyphosphate, sodium acetate and mixtures thereof.

---

The present invention relates to a process for the manufacture of polyimides having the following formula:

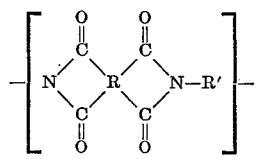

wherein R and R' are each an aliphatic, aromatic or cycloaliphatic radical which may contain hetero atoms and which may be alkyl-substituted or aryl-substituted. R and/or R' can also be a plurality of such radicals which may be joined together by functional groups such as

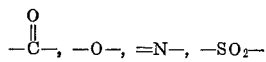

and the like.

It is in the prior art to manufacture polyimides of the above-named structure by reacting a tetracarboxylic acid dianhydride with a diamine. In a first stage of the reaction the acid anhydride group is split open with the formation of an amidocarboxylic acid,

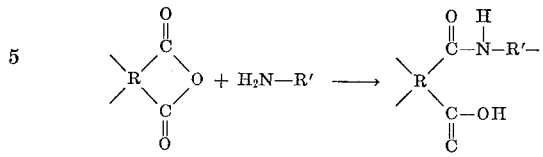

As this prepolymer is an amidocarboxylic acid it is still soluble in a number of solvents. When this prepolymer is heated to a temperature of between 300° C. and 500° C. it is converted into the insoluble polyimide under the splitting off of water.

The aforesaid procedure is associated with a number of disadvantages. It is a two-stage reaction in which the second reaction stage has to be carried out at a precisely adjusted and controlled, relatively high temperature. The formation of water in the second reaction stage also is disadvantageous at the high temperature it is possible that an undesirable saponification of the amide group may take place, and accordingly, the water must be completely removed. It is therefore necessary to operate in the presence of a water-binding agent, such as acetic acid anhydride, phosphoric acid, sulfuric acid and the like. Furthermore, there is the danger that the polymer that has already been formed may be decomposed again at the high cyclization temperature by the water that has formed.

In accordance with the invention it has now been found that polyimides having the following formula:

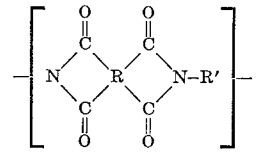

wherein R and R' each designate one or more aliphatic, aromatic or cycloaliphatic radicals, which may be substituted or which may contain hetero atoms, can be prepared by reacting a dicarboxylic acid diazide having the following formula:

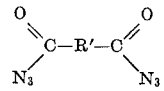

wherein R' has the same meaning as above set out, at a temperature of from 0° C. to 300° C. and preferably of from 50° C. to 200° C., with a tetracarboxylic acid dianhydride having the following formula:

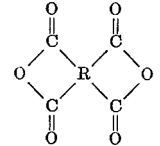

wherein R has the same meaning as given above.

This process has a considerable number of advantages over the prior-art processes. It is a one-stage reaction in which only the desired polyimides and gases are formed as reaction products; no water is formed, so that none of the amide compounds formed can be decomposed.

The high reactivity of the azides allows for a rapid carrying out of the reaction at low temperatures. The reaction temperature depends on the decomposition temperature, of the dicarboxylic acid diazide that is used as starting material. The commencement of the reaction can easily be detected by means of the incipient formation of gas. Therefore it is desirable to heat the mixture composed of the two reactants until the formation of gas commences. The reaction is at first allowed to continue at this temperature and when a substantial degree of conversion has taken place, the temperature can be further increased so as to bring the reaction to completion quickly. The end of the reaction can be determined in any case by the fact that the development of gas ceases.

It is advantageous to carry out the reaction in a solvent. Suitable solvents are those which react neither with acid anhydrides or with an acid azide. In this case the reaction temperature can be easily regulated. The process of the invention has the additional advantage that solvents can be used which can easily be removed from subsequently formed films, sheets or coatings.

It is also possible, however, to carry out the reaction without the use of any solvent. In this case, special care must be taken to heat the mixture of the two reactants slowly up to the decomposition temperature of the azide.

In any event, it is important that the starting azides be in very pure form and that they be dry.

The polyimides which are obtained by the process of the invention are not different from the products made by prior-art methods. Since equimolar amounts of the two reactants are used, the formation of products of high molecular weight is favored. The polyimides obtained are very pure, because of the fact that undesirable side-reactions do not take place during the process. The natural color of the polyimides is lighter than in products prepared by the methods known hitherto. Reaction products of pyromellitic acid anhydride and aromatic diamines are insoluble and infusible and have a high thermal stability.

When the radical R of the tetracarboxylic acid dianhydride used is an aromatic radical, infusible polyimides are obtained which cannot be fabricated by thermoplastic methods. The aromatic radical, as well as the other groupings which might take the place of the aromatic radical, can carry any desired substituents without adversely affecting the reaction. They may also contain hereto atoms, such as nitrogen, oxygen or sulfur.

Examples of suitable tetracarboxylic acid dianhydrides which can be used in carrying out the process of the invention are pyromellitic acid anhydride,
2,3,6,7-naphthalinetetracarboxylic acid dianhydride,
3,3',4,4'-diphenyltetracarboxylic acid dianhydride,
1,2,5,6-naphthalinetetracarboxylic acid dianhydride,
2,2',3,3'-diphenyltetracarboxylic acid dianhydride,
2,2-bis-(3,4-dicarboxyphenyl)-propanedianhydride,
bis-(3,4-dicarboxyphenyl)-sulfone dianhydride,
3,4,9,10-perylenetetracarboxylic acid dianhydride,
bis-(3,4-dicarboxyphenyl)-ether dianhydride,
bis-(3,4-dicarboxyphenyl)-ether dianhydride,
ethylenetetracarboxylic acid dianhydride,
1,2,4,5-naphthalinetetracarboxylic acid dianhydride,
1,4,5,8-naphthalinetetracarboxylic acid dianhydride,
1,4,5,8-decahydronaphthalinetetracarboxylic acid dianhydride,
4,8-dimethyl-1,2,3,5,6,7-hexahydronaphthaline-1,2,5,6-tetracarboxylic acid dianhydride,
2,6-dichloro-1,4,5,8-naphthaline-tetracarboxylic acid dianhydride,
2,7-dichloro-1,4,5,8-naphthaline-tetracarboxylic acid dianhydride,
2,3,6,7-tetrachloronaphthaline-1,4,5,8-tetracarboxylic acid dianhydride,
1,8,9,10-phenanthrenetetracarboxylic acid dianhydride,
1,2,3,4-cyclopentanetetracarboxylic acid dianhydride,
2,3,4,5-pyrrolidinetetracarboxylic acid dianhydride,
2,2-bis-(2,3-dicarboxyphenyl)-propanedianhydride,
1,1-bis-(2,3-dicarboxyphenyl)-ethane dianhydride,
1,1-bis-(3,4-dicarboxyphenyl)-ethane dianhydride,
bis-(2,3-dicarboxyphenyl)-methane dianhydride,
bis-(3,4-dicarboxyphenyl)-methanedianhydride,
bis-(3,4-carboxyphenyl)-sulfide dianhydride,
1,2,3,4-benzenetetracarboxylic acid dianhydride,
1,2,3,4-butanetetracarboxylic acid dianhydride,
thiophene-2,3,4,5-tetracarboxylic acid dianhydride,
sulfone dianhydride,
3,4,3',4'-benzophenonetetracarboxylic acid dianhydride,
ethylenediaminetetraacetic acid dianhydride, and mixtures thereof.

From the above listing, it can be seen that both saturated and unsaturated, aliphatic, cycloaliphatic, heterocyclic and mono- and polycyclic, aromatic tetracarboxylic acid dianhydrides are suitable as anhydride component in the process according to the invention.

Likewise, acid anhydrides which can be obtained by the reaction of 2 mols of tricarboxylic acid dianhydride with 1 mol of a bifunctional compound such as a diol, can be reacted according to the invention. Such anhydrides include, for example, compounds of the following structure:

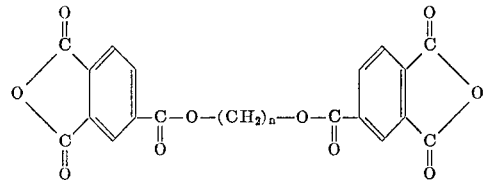

Suitable solvents for use in the process of the invention are hydrocarbons, such as high-boiling petroleum fractions, toluene, xylene, tetraline and decaline, halogenated hydrocarbons, such as o-dichlorobenzene and trichlorobenzene, ethers such as diphenyl ether and dioxane, substituted amides such as N-methyl-pyrrolidone, dimethylformamide and dimethylacetamide, esters such as benzoic acid methyl ester, sulfoxides and sulfones such as dimethylsulfoxide, tetramethylsulfone, or mixtures of these solvents.

The following are illustrative of dicarboxylic acid diazides wherein R is an aliphatic radical: malonic acid diazide, succinic acid diazide, adipic acid diazide, azelaic acid diazide, sebacic acid diazide. Diazides of unsaturated aliphatic dicarboxylic acids can also be used according to the invention including, for example, maleic acid diazide, butene(2)-1,4-dicarboxylic acid diazide, hexene(1)-1,6-dicarboxylic acid diazide and traumatinic acid diazide.

Illustrative of dicarboxylic acid diazides wherein R represents one or more aromatic radicals the following are listed: phthalic acid diazide, terephthalic acid diazide, diphenic acid diazide, homophthalic acid diazide, o-phenylene diacetic acid diazide, o-phenyleneacetic acid-β-propionic acid diazide, naphthaline-2,3-dicarboxylic acid diazide, naphthaline-2,5-dicarboxylic acid diazide, diphenyl-4,4'-dicarboxylic acid diazide, 1,3-diphenylpropane-4,4'-dicarboxylic acid diazide, stilbene-4,4'-dicarboxylic acid diazide, and tetrahydrophthalic acid diazide.

Quinolinic acid diazide is an example of a dicarboxylic acid diazide having a hetero atom, while the following acids are examples of such dicarboxylic acid diazides in which two radicals are joined together by a functional group:

1,3-diphenylacetonyl-4,4'-dicarboxylic acid diazide

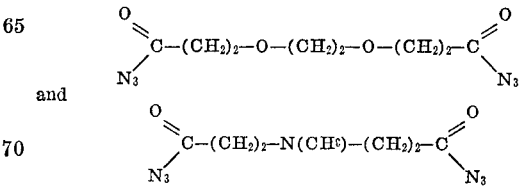

and

The following examples are given for the purpose of illustrating the invention and are in no wise to be construed as a limitation of the scope thereof.

EXAMPLE 1

4.33 g. (0.02 mol) of terephthalic acid diazide and 4.38 g. (0.02 mol) of pyromellitic acid anhydride were stirred into 66 ml. of o-dichlorobenzene at room temperature and the mixture slowly heated. At about 100° C. a violent reaction took place under strong evolution of gas. After the reaction had abated at this temperature, the mixture was heated up to the boiling temperature of the o-dichlorobenzene and heated for another three hours at this temperature under refluxing. Thereafter the mixture was allowed to cool; the polyimide which had formed was then filtered out, purified with boiling methanol, and then vacuum dried at 100° C.

The product which was recovered was a light brown powder which did not melt and did not dissolve in any solvent. In the infrared spectrum it showed the band combination characteristic of a dicarboxylic acid imide at 1735 cm.$^{-1}$ and 1790 cm.$^{-1}$, and was free of acid groups, acid anhydride groups and amide groups.

EXAMPLE 2

The same procedure was followed as has been set out in Example 1, but inistead of terephthalic acid diazide, the same amount of isophthalic acid diazide was used. The reaction had already set in at 90° C. The polyimide which was obtained was also a light brown, infusible powder that was not soluble in any solvent, was also free of acid, acid anhydride and amide groups, and in the infrared spectrum displayed the band combination at 1735 cm.$^{-1}$ and 1790 cm.$^{-1}$ that characteristic of a dicarboxylic acid imide.

I claim:

1. Process for the preparation of polyimides consisting essentially of the recurring structural unit:

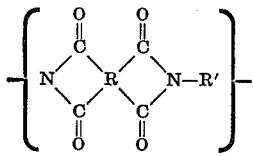

wherein R and R' each represents at least one member selected from the group consisting of aliphatic, aromatic, cycloaliphatic radicals and a plurality of such radicals joined together with a member selected from the group consisting of

—O—, =N— and —SO$_2$— which process comprises reacting a dicarboxylic acid diazide having the formula:

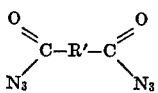

wherein R' has the same meaning as given above, with a tetracarboxylic acid dianhydride having the formula:

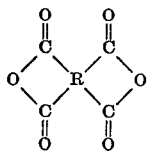

wherein R has the same meaning as given above, at a temperature of from 0° C. to 300° C.

2. Process according to claim 1 which comprises conducting the reaction at a temperature of from 50 to 200° C.

3. Process according to claim 1 which comprises conducting the reaction in an inert solvent which reacts neither with acid anhydride nor an acid azide.

4. Process according to claim 3 wherein said inert solvent is a member selected from the group consisting of hydrocarbon solvents, ethers, esters, halogenated hydrocarbons, amides, sulfoxides, sulfones and mixtures thereof.

5. Process according to claim 1 wherein said tetracarboxylic acid anhydride is a member selected from the group consisting of pyromellitic acid anhydride,
2,3,6,7-naphthalinetetracarboxylic acid dianhydride,
3,3',4,4'-diphenyltetracarboxylic acid dianhydride,
1,2,5,6-naphthalinetetracarboxylic acid dianhydride,
2,2',3,3'-diphenyltetracarboxylic acid dianhydride,
2,2-bis-(3,4-dicarboxyphenyl)-propanedianhydride,
bis-(3,4-dicarboxyphenyl)-sulfone dianhydride,
3,4,9,10-perylenetetracarboxylic acid dianhydride,
bis-(3,4-dicarboxyphenyl)-ether dianhydride,
bis-(3,4-dicarboxylphenyl)-ether dianhydride,
ethylenetetracarboxylic acid dianhydride,
1,2,4,5-naphthalinetetracarboxylic acid dianhydride,
1,4,5,8-naphthalinetetracarboxylic acid dianhydride,
1,4,5,8-decahydronaphthalinetetracarboxylic acid dianhydride,
4,8-dimethyl-1,2,3,5,6,7-hexahydronaphthaline-1,2,5,6-tetracarboxylic acid dianhydride,
2,6-dichloro-1,4,5,8-naphthalinetetracarboxylic acid dianhydride,
2,7-dichloro-1,4,5,8-naphthalinetetracarboxylic acid dianhydride,
2,3,6,7-tetrachloronaphthaline-1,4,5,8-tetracarboxylic acid dianhydride,
1,8,9,10-phenanthrenetetracarboxylic acid dianhydride,
1,2,3,4-cyclopentanetetracarboxylic acid dianhydride,
2,3,4,5-pyrrolidinetetracarboxylic acid dianhydride,
2,2-bis-(2,3-dicarboxyphenyl)-propanedianhydride,
1,1-bis-(2,3-dicarboxyphenyl)-ethane dianhydride,
1,1-bis-(3,4-dicarboxyphenyl)-ethane dianhydride,
bis-(2,3-dicarboxyphenyl)-methane dianhydride,
bis-(3,4-dicarboxyphenyl)-methanedianhydride,
bis-(3,4-carboxyphenyl)-sulfide dianhydride,
1,2,3,4-benzenetetracarboxylic acid dianhydride,
1,2,3,4-butanetetracarboxylic acid dianhydride,
thiophene-2,3,4,5-tetracarboxylic acid dianhydride,
sulfone dianhydride,
3,4,3',4'-benzophenonetetracarboxylic acid dianhydride,
ethylenediaminetetraacetic acid dianhydride and mixtures thereof.

6. Process according to claim 5 wherein said dicarboxylic acid diazide is a member selected from the group consisting of malonic acid diazide,
succinic acid diazide,
adipic acid diazide,
azelaic acid diazide,
sebacic acid diazide,
maleic acid diazide,
butene (2)-1,4-dicarboxylic acid diazide,
hexene (1)-1,6-dicarboxylic acid diazide,
traumatinic acid diazide,
phthalic acid diazide,
terephthalic acid diazide,
diphenic acid diazide,
homophthalic acid diazide,
o-phenylene diacetic acid diazide,
o-phenyleneacetic acid-β-propionic acid diazide,
naphthaline-2,3-dicarboxylic acid diazide,
naphthaline-2,5-dicarboxylic acid diazide,
diphenyl-4,4'-dicarboxylic acid diazide,
1,3-diphenylpropane-4,4'-dicarboxylic acid diazide,
stilbene-4,4'-dicarboxylic acid diazide,
tetrahydrophthalic acid diazide,
quinolinic acid diazide,
1,3-diphenylacetonyl-4,4'-dicarboxylic acid diazide

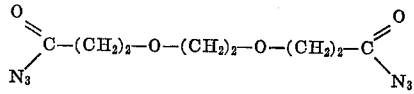

and

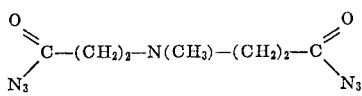

7. Process for the production of polyimides consisting essentially of the recurring structural unit:

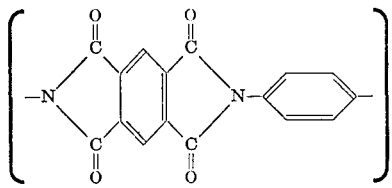

comprising reacting terephthalic acid diazide with pyromellitic acid dianhydride at temperatures between 0° C. and 300° C.

8. Process for the production of polyimides consisting essentially of the recurring structural unit

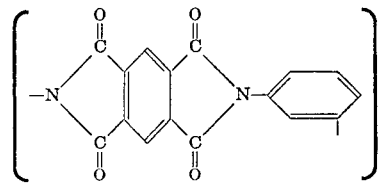

comprising reacting isophthalic acid diazide with pyromellitic acid anhydride at temperatures between 0° C. and 300° C.

References Cited

UNITED STATES PATENTS 3,179,633   4/1965   Endrey _____ 260—78
3,179,634   4/1965   Edwards _____ 260—78

WILLIAM H. SHORT, Primary Examiner

L. L. LEE, Assistant Examiner

U.S. Cl. X.R.

260—63, 65, 78, 78.4